United States Patent [19]

Goldhammer et al.

[11] Patent Number: 4,611,773

[45] Date of Patent: Sep. 16, 1986

[54] TAPERED THICKNESS-CHORD RATIO WING

[75] Inventors: Mark I. Goldhammer; Armand Sigalla, both of Bellevue, Wash.

[73] Assignee: The Boeing Company, Seattle, Wash.

[21] Appl. No.: 685,970

[22] Filed: Dec. 27, 1984

Related U.S. Application Data

[63] Continuation of Ser. No. 454,588, Dec. 30, 1982, abandoned.

[51] Int. Cl.⁴ .................................................. B64C 3/10
[52] U.S. Cl. .................................................. 244/35 R
[58] Field of Search ................. 244/35 R, 34 R, 45 R, 244/198, 130

[56] References Cited

U.S. PATENT DOCUMENTS

| | | | |
|---|---|---|---|
| 1,493,928 | 5/1924 | Gallaudet | 244/35 R |
| 1,508,592 | 9/1924 | Breguet | 244/35 R |
| 1,547,644 | 7/1925 | Cronstedt | 244/35 R |
| 1,792,015 | 2/1931 | Herrick | 244/35 R |
| 1,890,079 | 12/1932 | Focke | 244/35 R |
| 2,257,260 | 9/1941 | Kartiveli | 244/35 R |
| 2,281,272 | 4/1942 | Davis | 244/35 R |
| 2,441,758 | 5/1948 | Garbell | 244/35 R |
| 2,498,262 | 2/1950 | Garbell | 244/35 R |
| 2,628,043 | 2/1953 | Montgomery | 244/35 R |
| 2,643,076 | 6/1953 | Hurel | 244/35 R |
| 2,709,052 | 5/1955 | Berg | 244/35 R |
| 4,240,598 | 12/1980 | Espin et al. | 244/35 R |

FOREIGN PATENT DOCUMENTS

| | | | |
|---|---|---|---|
| 2803041 | 8/1979 | Fed. Rep. of Germany | 244/35 R |
| 2909245 | 9/1980 | Fed. Rep. of Germany | 244/35 R |
| 545678 | 10/1922 | France . | |
| 922952 | 6/1947 | France | 244/35 R |
| 307463 | 6/1930 | United Kingdom . | |
| 634345 | 3/1950 | United Kingdom | 244/35 R |

OTHER PUBLICATIONS

*Journal of Aircraft*, vol. 18, No. 2, Feb. 1981, pp. 121–127, P. A. Henne, "Inverse Transonic Wing Design Method".

*Primary Examiner*—Trygve M. Blix
*Assistant Examiner*—Rodney Corl
*Attorney, Agent, or Firm*—Christensen, O'Connor, Johnson & Kindness

[57] ABSTRACT

A swept wing for jet transports having a thickness-chord length (t/c) ratio that continuously decreases (i.e., tapers) from the wing root to the wing tip is disclosed. The tapered t/c ratio wing has reduced weight and improved overall efficiency when compared to conventional, constant t/c ratio wings. While the t/c ratio of the wing tapers, the combined structural and skin strength of the wing remains adequate to handle bending loads imposed by lift and engine weight. In this regard, the cross-sectional thickness of the midspan region of the wing is chosen such that the wing skin thickness can be reduced to the minimum allowable for the skin material. Also, the cross-sectional thickness of the outboard region of the wing is decreased, resulting in decreased drag and weight in this region. Further, the camber of the outboard portion of the wing is increased (as compared to the camber of a constant t/c ratio wing) to prevent the unsweeping of spanwise oriented isobars.

8 Claims, 8 Drawing Figures

A: 63%
B: 79%
C: 88%
D: 95%
E: 100%

TAPERED THICKNESS-CHORD RATIO WING

This application is a continuation based on prior application Ser. No. 454,588, filed Dec. 30, 1982, now abandoned.

BACKGROUND OF THE INVENTION

This invention relates to wings, and more particularly, to transonic wings.

The majority of transonic wings currently in use have thicknesschord length (t/c) ratios, i.e., the ratio of wing thickness to chord length, that begins at a maximum value adjacent the side of the fuselage and rapidly decreases in the outward wing direction to approximately 30% semispan. Beyond the 30% semispan location, the t/c ratio is approximately constant. This t/c ratio distribution allows the outboard portion of the wing (which is the most important portion in terms of critical mach number) to be designed using a relatively simple two-dimensional airfoil technique, which takes into account the effects of wing sweep and planform taper.

While wings having a constant t/c ratio from the 30% semispan location to the wing tip are relatively easy to design, such wings have certain disadvantages. Specifically, they are heavier than required by lift and engine loads imposed upon them. Further, they are less efficient than desired. More specifically, the air loading of a typical jet transport wing decreases along the span of the wing from approximately 75% semispan outwardly to the tip. Air loading decreases because the spanwise load is tailored to minimize induced drag and because of tip effects. Even though air loading decreases near the outer end of a wing, a constant t/c ratio wing is thicker than necessary in this region. That is, the outer portion of such a wing has greater structural bending strength in the spanwise direction than needed to support the decreasing air loads. Since the outboard region is thicker than necessary, the aerodynamic drag and weight of a constant t/c ratio wing is also greater than necessary.

One approach to reducing the aerodynamic drag and weight of a wing is to decrease or taper the t/c ratio of the wing continuously from wing root to tip. Decreasing wing weight by tapering the t/c ratio of the wing without consideration of three dimensional aerodynamic design would be unacceptable because such a wing would have a premature drag rise due to the unsweeping of transonic isobars, and more importantly, the shock, on the wing surface. Transonic isobar unsweeping would occur because an increasing amount of wing lift is carried on the lower surface of the wing as wing thickness is reduced. The present invention is directed to a tapered t/c ratio wing that avoids this disadvantage. That is, the present invention is directed to a tapered t/c ratio wing having a transonic isobar pattern similar to that occurring on the surface of a constant outboard t/c ratio wing.

SUMMARY OF THE INVENTION

In accordance with the present invention, a continously tapered thickness-chord length (t/c) ratio wing (hereinafter referred to as a tapered ratio wing) is provided. The tapered ratio wing weighs less and has less drag than a constant t/c ratio wing (hereinafter referred to as a constant ratio wing) having equivalent speed and lift capabilities. Further, the tapered ratio wing is formed such that isobars produced at transonic speeds will not unsweep. In accordance with the invention, the tapered ratio wing has airfoil shapes whose t/c ratio continuously decreases across the wing span going from the root to the tip. Further, the camber of the tapered ratio wing is tailored in a manner that prevents the unsweeping of spanwise oriented isobars that are produced when the wing moves through the air at transonic speeds.

Preferably, aerodynamically tailoring the tapered ratio wing to prevent the unsweeping of spanwise oriented isobars includes increasing the incremental camber separation of the tapered ratio wing in the outward spanwise direction relative to a constant ratio wing having the same sweep and planform. The incremental camber separation is defined as the displacement of the camber line of a tapered ratio wing relative to the camber line of a constant ratio wing at the same spanwise location. Preferably, the incremental camber separation increases from less than 0.0015c (chord length) at approximately 60% semispan to greater than 0.0085c at the tip of the wing. Tailoring the wing shape in this manner results in a tapered ratio wing that has more maximum lift coefficient capability and more buffet margin than a constant ratio wing having comparable speed and lift capabilities.

Also, preferably, the midspan region of a tapered ratio wing formed in accordance with this invention is configured to be thicker than the corresponding region of a constant ratio wing, permitting the outer skin of the wing to be thinned while maintaining adequate bending strength. Additionally, a thicker midspan region provides the tapered ratio wing with greater torsional rigidity and less weight in the area where wing-mounted engines are normally located.

BRIEF DESCRIPTION OF THE DRAWINGS

Other aspects and advantages of the present invention will become apparent to one skilled in the art after a reading of the following description of a preferred embodiment of the invention taken together with the accompanying drawing in which.

DETAILED DESCRIPTION

Figure 1:
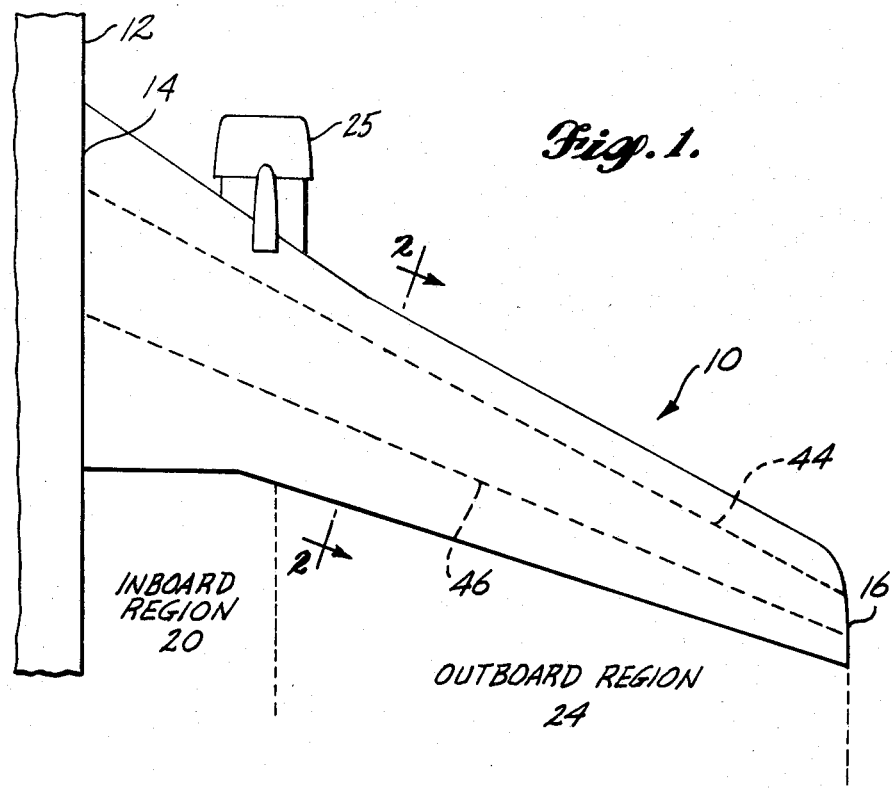
FIG. 1 is a plan view of a swept wing having a single wing-mounted engine.

FIG. 1 depicts a plan view of a tapered thickness-chord length (t/c) ratio swept wing 10 (hereinafter a "tapered ratio wing") attached to the fuselage 12 of an aircraft. Spanwise, tapered ratio wing 10 starts at a root 14 located adjacent the fuselage 12 and terminates at a tip 16. Spanwise positions on tapered ratio wing 10 are referred to herein in terms of their percent locations along the span of the wing, with the root being 0% and the tip being 100%. For descriptive purposes, the tapered ratio wing 10 is divided into inboard and outboard regions 20 and 24, respectively. The inboard region 20 extends from the wing root 14 to approximately 35% semispan, and the outboard region 24 extends from approximately 35% semispan to the wing tip 16. In the embodiment shown, a wing-mounted engine 25 is located at approximately 35% semispan.

Preferably, the planform of the tapered ratio wing 10 is the same as that of a conventional swept wing having a constant t/c ratio (hereinafter a "constant ratio wing"). As a result, the considerations involved in choosing a wing planform, such as overall aerodynamic efficiency, spanwise distribution of sectional lift coefficients, airspeed requirements, wing weight, and internal volume, are not affected by incorporation of the present invention. Since standard techniques are employed to establish the planform shape for the tapered ratio wing 10, they will not be discussed herein.

While the cross-sectional configuration (e.g., spanwise sections) of the tapered ratio wing 10 vary considerably in thickness from the root 14 to the tip 16, the location and configuration of the wing structural components of each section is substantially identical. A typical spanwise section 26 is illustrated in FIG. 2 and discussed next.

Figure 2:
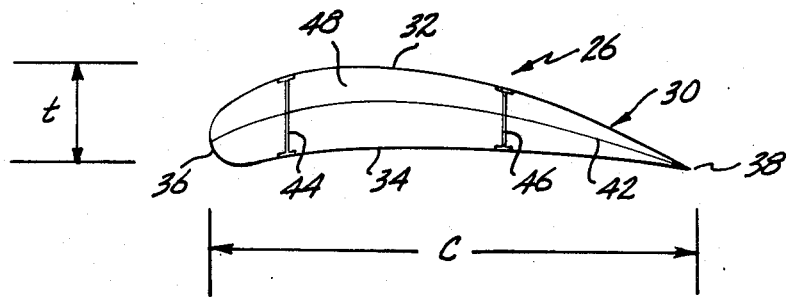
FIG. 2 is a side elevation, cross-sectional view of the wing taken along section line 2—2 of FIG. 1.

The spanwise section 26 illustrated in FIG. 2 includes an outer skin 30, which defines an upper surface 32 and a lower surface 34 that extend from a leading edge 36 to a trailing edge 38. In FIG. 2, a camber line 42 is shown extending between the leading edge 36 and the trailing edge 38. The camber line 42 is a reference line that lies one-half the distance between the upper and lower surfaces 32 and 34. The camber line 42 is to be distinguished from the wing chord, which is the shortest distance between the leading and trailing edges 36 and 38.

Located between the upper and lower surfaces 32 and 34 are two spars—a front spar 44 and rear spar 46. The front and rear spars 44 and 46 are oriented substantially vertically and extend spanwise from the root 14 to wing tip 16 (FIG. 1). The maximum distance between upper and lower surfaces 32 and 34 of any spanwise section 26 is the wing thickness of that section. The front and rear spars 44 and 46 and the portions of upper and lower surfaces 32 and 34 between the spars form a wing box 48 that is the main structural load bearing component of the tapered ratio wing 10. As will be readily appreciated by those skilled in this art from the foregoing description of FIG. 2, the tapered ratio wing 10 has an arrangement of component parts that is substantially identical to that of a conventional constant ratio wing.

Figure 3:
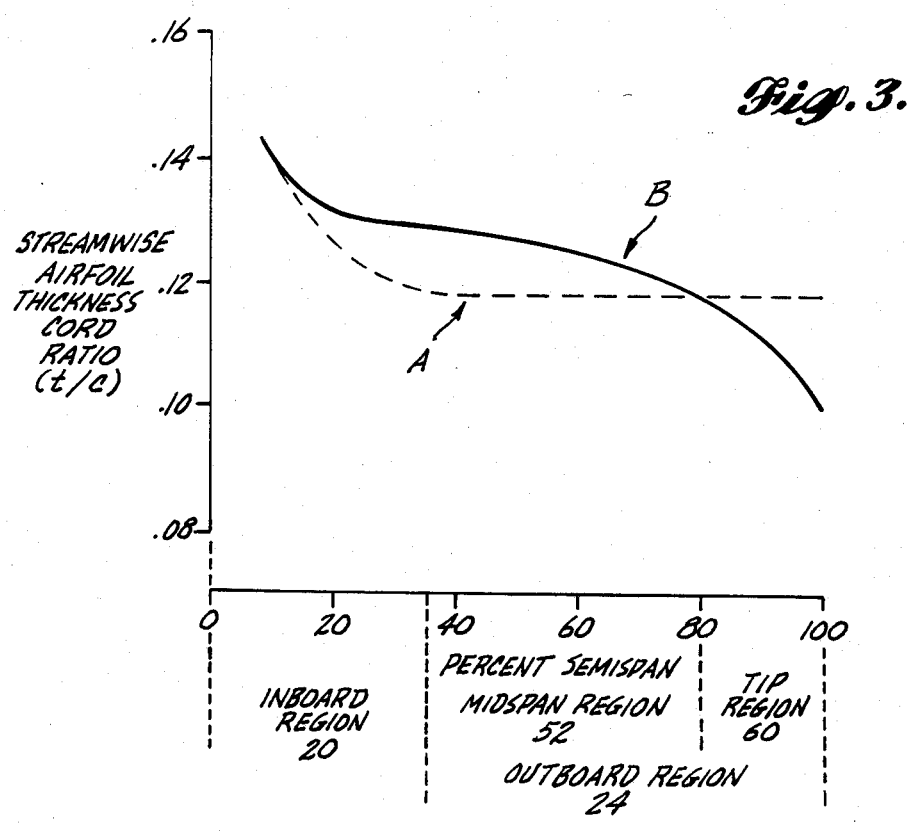
FIG. 3 is a graph showing the relationship between the thickness-chord length (t/c) ratio and spanwise location for a constant ratio wing and a tapered ratio wing.

Since various aspects of the present invention will be best understood when explained in comparison with a conventional, constant ratio wing, the following discussion is based on such a comparision. In this regard, FIG. 3 is a graph plotting the t/c ratios of a constant ratio wing and a tapered ratio wing 10 against semispan location. More specifically, dashed line A denotes the t/c ratio for a constant ratio wing, i.e., a wing having a substantially constant t/c ratio from approximately 30% semispan outward to the wing tip, and solid line B denotes the t/c ratio for tapered ratio wing 10 formed in accordance with the invention. The constant and tapered ratio wings upon which the graph of FIG. 3 is based are designed to have approximately the same lift and speed capability. As can be seen from FIG. 3, the t/c ratios of a tapered ratio wing 10 are the same as the t/c ratios of a constant ratio wing at only two spanwise locations—the root and 80% semispan.

Figure 4:
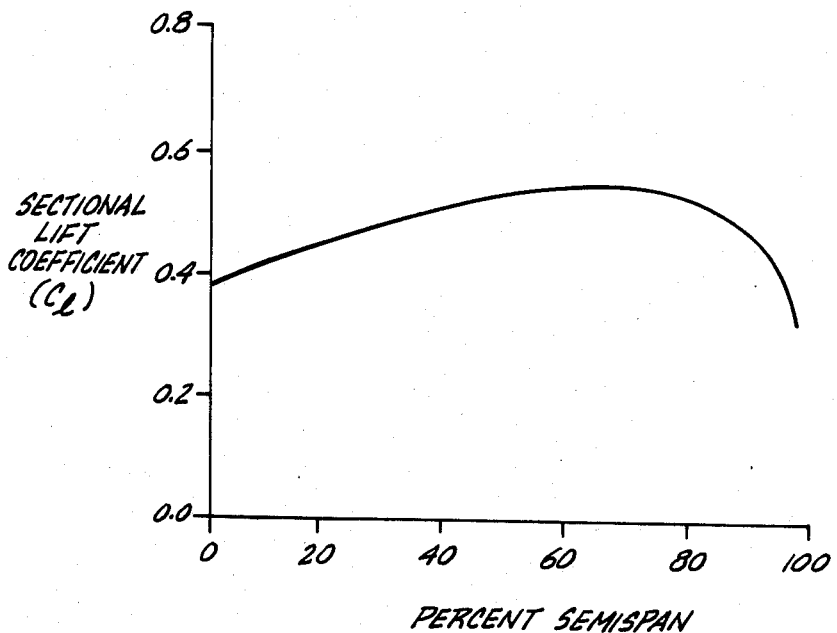
FIG. 4 is a graph showing the desired relationship between sectional lift coefficient and spanwise locations for a wing.

The mach number capability of a typical medium aspect ratio transport wing, i.e., a wing having an aspect ratio of 6 to 10, is usually limited by the portion of the wing lying in the 60% to 80% semispan region, where the sectional lift coefficient, $C_l$, is highest (FIG. 4). It is in this same semispan region that the t/c ratio curve of a tapered ratio wing 10 will cross the t/c ratio curve of a constant ratio wing designed for the same speed and lift capability. That is, while FIG. 3 illustrates t/c ratio curves crossing at 80% semispan, this crossing point is to be taken as exemplary, not limiting. Curves comparing other tapered ratio wings formed in accordance with the invention with constant ratio wings having equivalent speed and lift capabilities will cross at other locations lying in the 60% to 80% semispan region.

Curve B of FIG. 3 represents the t/c ratio distribution of an actual embodiment of the invention. In this embodiment, both the thickness (t) and the chord length (c) of each spanwise section 26 (FIG. 2) decreased linearly from approximately 35% semispan to the tip 16. While both thickness and chord length decreased in a linear manner, the rate of change of each parameter is different, resulting in curve B being defined by a quadratic equation. While nonlinear thickness and/or chord length changes fall within the scope of the invention, choosing a linearly varying thickness distribution has the manufacturing advantage of allowing linearly changing front and rear spars 44 and 46 to be used, as opposed to nonlinearly changing spars, which are more expensive to produce.

As noted above, preferably, the planform of the tapered ratio wing 10 is the same as a constant ratio wing having similar speed and lift capabilities. As a result, the spanwise lift distribution curve for the tapered ratio wing 10 is the same as that for a constant ratio wing. FIG. 4 is an example of a spanwise distribution curve for a constant ratio, and, thus, a tapered ratio wing formed in accordance with the invention. More specifically, FIG. 4 is a graph showing the distribution of sectional lift coefficient ($C_l$) for tapered ratio wing 10 with respect to percent semispan location. The relationship between sectional lift coefficient and sectional lift is given by the equation:

$$\text{Sectional Lift} = C_l q S$$

where:
  $C_l$ = sectional lift coefficient
  $q = \frac{1}{2}\rho v^2$ ($\rho$ = air density and $v$ = freestream air velocity) and,
  $S$ = representative area.

As will be observed from viewing FIG. 4, the span loading decreases from 80% semispan outwardly (hereinafter referred to as tip region 50). It is this decrease that allows the thickness of the tip region 50 of a tapered ratio wing 10 formed in accordance with the invention to be substantially decreased. And, of course, it is the variation in thickness that reduces overall wing weight and decreases aerodynamic drag. That is, as known to those skilled in this art, the cross-sectional configuration of the tip region of a constant ratio wing is thicker than required by the bending force created by lift loads. The added thickness arises not from structural requirements, but from the use of a constant t/c ratio design approach. The end result is a wing with greater aerodynamic drag and weight than desired. While the weight of the tip region could theoretically be decreased by using thinner skin material, this approach is limited by skin materials minimum gage requirements created by fastener insertion, puncture resistance, and the need to withstand lightning strikes. The tapered ratio wing 10 overcomes these disadvantages by reducing the thickness of the tip region 50 of the wing as compared to the thickness of the tip region of a constant ratio wing. The thickness is decreased to the point where the spanwise bending strength of the tip region 50 corresponds more closely to that required to withstand the bending moments imposed by the lift forces.

Two advantages result from the thinner tip region 50 of a tapered ratio wing 10 formed in accordance with the invention. The first advantage is the reduction in weight that is achieved by reducing the height of wing box 48. The second advantage is the reduction in aerodynamic drag due to reduced thickness super velocities.

While the tip region 50 of a tapered ratio wing 10 formed in accordance with the invention is thinner than the tip region of a constant ratio wing, the remainder of outboard region 24, i.e., the 35% to 80% semispan region (hereinafter referred to as midspan region 52) is, preferably, choosen to be thicker than the corresponding region of an equivalent capability constant ratio wing. Choosing a thickness greater than that of a constant ratio wing has both weight and torsional rigidity benefits, which are discussed next.

The required bending strength of the midspan region of a constant ratio wing is normally achieved by increasing skin thickness above the minimum gage required by fastener installation, puncture resistance, etc., rather than increasing the spanwise bending strength of the structural components that support the skin. Because a tapered ratio wing avoids the tight thickness limitations of a constant ratio wing, wing thickness, and thus, spanwise strength, can be increased without requiring that skin thickness be increased over the minimum gage required by other factors. Moreover, structural component spanwise bending strength does not need to be increased since such strength is automatically increased by the thicker wing. In other words, increasing the thickness of the midspan region 52 automatically increases the spanwise bending strength of spars 44 and 46 because the height of the spars, and thus, their section modulus, is increased. The greater structural spanwise bending strength in midspan region 52 allows the thickness of the outer skin 30 to be decreased without any overall loss in spanwise bending strength. As a result, the overall weight of the midspan region 52 of a tapered ratio wing 10 relative to a constant ratio wing is decreased.

A further advantage of increasing the thickness of the midspan region 52 is an increase in the torsional rigidity of the wing in the region where a wing-mounted engine 25 is normally located, thus providing a stronger mounting structure for the engine.

While the drag of the midspan region 52 of a tapered ratio wing 10 formed in accordance with the invention is increased by a small amount (when compared to a constant ratio wing with the same capabilities) due to the increase in wing thickness, the increase in overall aircraft efficiency gained by the decreased weight of a tapered ratio wing 10 is greater than the decrease in efficiency resulting from the increased drag of the midspan region 52.

The thickness of the inboard region 20 of a tapered ratio wing 10 formed in accordance with this invention is, preferably, chosen to be approximately the same as the corresponding thickness of this region of a constant ratio wing. As known to those skilled in the art, the sections in the inboard region of a conventional, constant ratio wing require extensive three-dimensional aerodynamic design. The inboard sections of a tapered ratio wing 10 formed in accordance with the invention requires similar design tailoring. The required tailoring techniques are well-known to those skilled in the art and they will not be discussed herein.

Figure 5A:
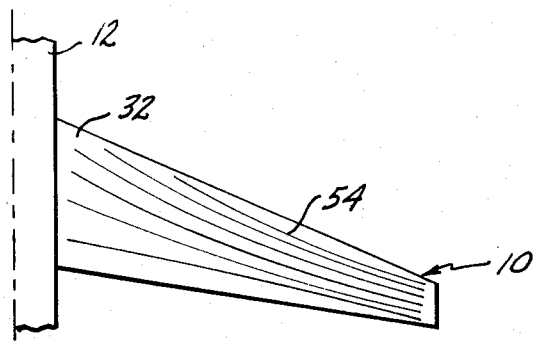
FIG. 5a is a schematic plan view of a swept wing showing a desirable transonic isobar pattern.
Figure 5B:
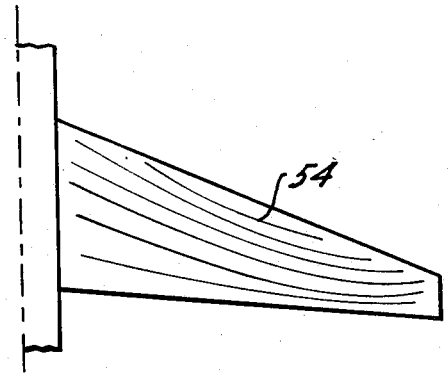
FIG. 5b is a schematic plan view of a swept wing showing the unsweeping of transonic isobars.

Since no portion of a tapered ratio wing 10 formed in accordance with this invention behaves like a two-dimensional airfoil, the entire outboard region 24 must also be tailored. Without tailoring, the transonic isobars and shock developed on the wing will unsweep in the outboard region 24 (see FIG. 5b), resulting in increased drag. In this regard, a preferred transonic isobar pattern for the upper surface 32 of a swept wing is depicted in FIG. 5a. As illustrated, the isobars 54 on the outboard region 24 of the wing lie substantially parallel to the sweep of the wing. In order to achieve a desirable isobar pattern (FIG. 5a) and not a pattern that results in the unsweeping of isobars (FIG. 5b), a tapered ratio wing 10 formed in accordance with the invention is tailored by "over-cambering" the wing relative to the camber of a constant ratio wing.

Figure 6:
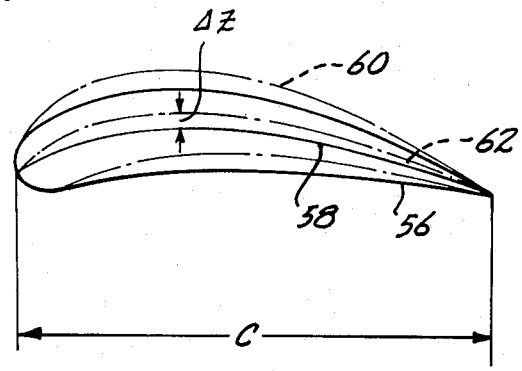
FIG. 6 is a schematic side elevational view of sections of a tapered ratio wing and a constant ratio wing taken at the same spanwise location showing the difference in camber between the two wings; and, FIG. 7 is a graph showing the relationship between incremental camber separation and chordwise and spanwise location.

The concept of over-cambering is illustrated in FIG. 6, wherein equal chord length sections of a tapered ratio wing 10 and a constant ratio wing having comparable lift and speed capabilites are compared. In this Figure, a section 56 of a constant ratio wing having a camber line 58 is depicted by solid lines and a section 60 of a tapered ratio wing formed in accordance with the invention having a camber line 62 is depicted by dashed lines. As clearly shown in FIG. 6, the camber line 62 of the tapered ratio wing section 60 lies above the camber line 58 of the constant ratio wing section 56. The separation between the two camber lines defines an incremental camber separation $\Delta z$, which starts at zero at the leading edge of the wing, increases to a maximum value at some point located forward of the 50% chord line, and then decreases to zero at the trailing edge of the wing. Further, the incremental camber separation $\Delta z$ of the preferred embodiment of a tapered ratio wing 10 formed in accordance with this invention increases in the spanwise direction from approximately 60% semispan to the tip 16.

Figure 7:
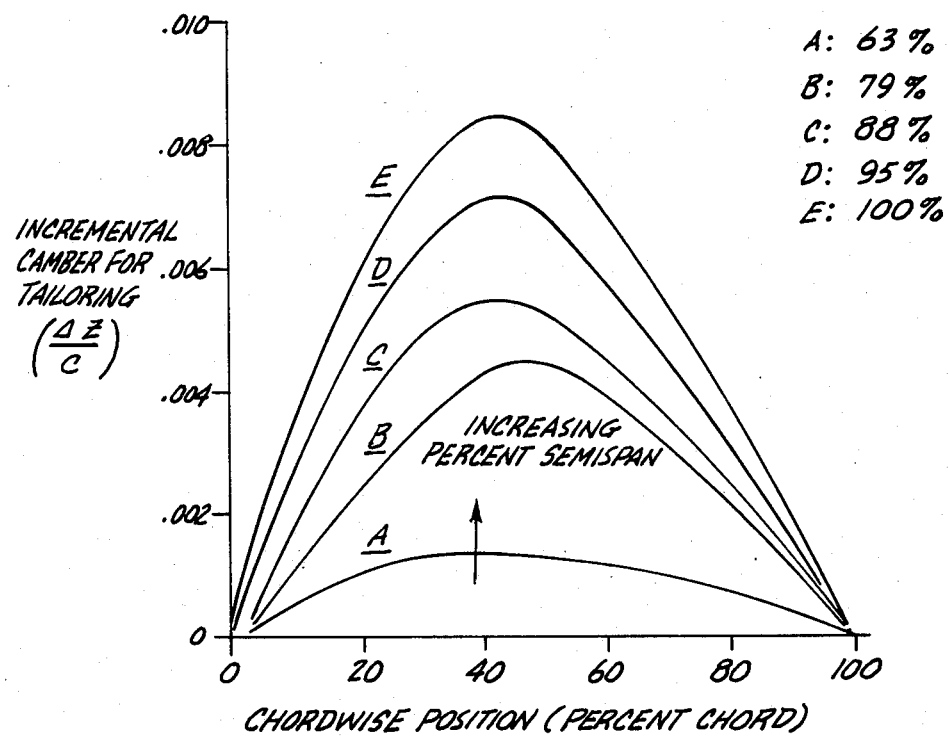

As shown in FIG. 7, in one actual embodiment of the invention, the maximum incremental camber separation at 63% semispan was reached at approximately the 39% chord position and had a value of approximately 0.0015 chord length at the semispan position; the maximum incremental camber separation at 79% semispan was reached at approximately the 43% chord position and had a value of approximately 0.0042 to the chord length at this semispan position; the maximum incremental camber separation at 88% semispan was reached at approximately the 41% chord position and had a value of approximately 0.0055 of the chord length at this semispan position; the maximum incremental camber distance at 95% semispan was reached at approximately the 41% chord position and had a value of approximately 0.007 of the chord length at this semispan position; and, the maximum incremental camber distance at 100% semispan was reached at approximately the 41% chord position and had a value of approximately 0.0082 of the chord length at this semispan position.

The determination of the additional camber necessary to blend the continuously tapering sections of tapered ratio wing 10 together into an acceptable three-dimensional wing design can be accomplished by a variety of techniques well-known to practicing aerodynamicists. One approach to the problem uses a transonic wing analysis/design finite difference solution, such as the well accepted computer program of Anthony Jameson of the Courant Institute of Mathematics at New York University, to design very accurately the upper surface for the desired upper surface isobar pattern. Another approach uses a linearized camber/thickness lifting surface theory computer program in which the wing is represented by planar distributions of discrete vortex and source panels that mathematically represent the camber and thickness of the wing, respectively. A finite element solution for the vortex and source panel strengths is formulated to yield the desired upper and lower surface distributions. For a tapered ratio wing 10 formed in accordance with the present invention, after the thickness envelopes of the wing are specified by fixing the surface source distribution, the camber distribution can be determined from the desired upper surface pressure distribution developed in the manner just described. There are a number of computer programs available to solve this type of problem, or one can be formulated from text book information. Use of a large digital computer is required. Finally, a reasonably close camber design can be accomplished rather quickly by trial and error design and analysis cycles using any standard potential flow wing analysis program, many of which are in the public domain and readily available from the National Aeronautical and Space Administration, universities, etc.

In addition to the weight improvement discussed above, due to the aerodynamic tailoring required to make the tapered ratio wing 10 formed in accordance with the invention work at transonic speeds, it has been found that such a wing has more maximum lift coefficient capability and more buffet margin than a comparable constant ratio wing. These improvements in the performance of the tapered ratio wing 10 formed in accordance with the invention appear to be a direct consequence of the increased incremental camber separation on outboard region 24 of the wing included to achieve the desired transonic isobar pattern.

While a preferred embodiment of the invention has been illustrated and described, it will be appreciated that various changes can be made without departing from the spirit and scope of the invention. For example, as noted above, while a tapered ratio wing formed in accordance with the invention having a linear chord length decrease and a linear thickness decrease (at different rates) has manufacturing advantages, the decreasing rate of change of either or both of these parameters may be nonlinear if desired. Additionally, as will be recognized by those skilled in the art, a tapered ratio wing formed in accordance with this invention may include discontinuities in the decreasing t/c ratio, i.e., a constant or increasing t/c ratio, for the installation of lights, mechanical systems, or other auxiliary equipment. A tapered ratio wing formed with such discontinuities in the t/c ratio does not depart from the spirit and scope of the invention. Further, the tailoring of the outboard portion of the wing discussed above and depicted in FIG. 7 are considered exemplary, not limiting. It is therefore intended that the scope of Letters Patent granted hereon be limited only by the definitions contained in the appended claims and equivalents thereof.

The embodiments of the invention in which an exclusive property or privilege is claimed are defined as follows:

1. A tapered ratio wing suitable for use by aircraft designed to travel at subsonic and transonic speeds, said tapered ratio wing including an upper surface and a lower surface, said upper and lower surfaces defining an airfoil having a leading edge and a trailing edge, said airfoil having a cross-sectional configuration that defines a thickness and a chord length, both the thickness and chord length of the cross-section of said airfoil continuously decreasing from the root of said wing to the tip thereof, the ratio of said thickness to said chord length of said cross-sections of said airfoil also continuously decreasing from the root of said wing to the tip thereof, the outboard region of said tapered ratio wing being tailored to prevent the unsweeping of spanwise oriented isobars that are produced when the wing moves through the air at transonic speeds.

2. A tapered ratio wing as claimed in claim 1, wherein the thickness of said airfoil cross-sections decreases in a linear manner.

3. A tapered ratio wing as claimed in claim 2, wherein the chord length of said airfoil cross-sections decreases in a linear manner.

4. A tapered ratio wing as claimed in claim 3, wherein the rate of linear decrease of the thickness of said airfoil cross-sections is different than the rate of linear decrease of the chord length of said airfoil.

5. A tapered ratio wing as claimed in claim 4, wherein the continuous decrease of the ratio of said thickness to said chord length of said airfoil cross-sections occurs in a manner capable of representation by a quadratic equation.

6. A tapered ratio wing as claimed in claim 1, wherein the continuous decrease of the ratio of said thickness to said chord length of said airfoil cross-sections occurs in a manner capable of representation by a quadratic equation.

7. The tapered ratio wing as claimed in claim 1, wherein the camber of the tapered ratio wing as defined by the wing camber line is tailored to prevent the unsweeping of spanwise oriented isobars that are produced when the wing moves through the air at transonic speeds.

8. The tapered ratio wing as claimed in claim 1, wherein the ratio of said thickness to said chord length varies with semispan location substantially as indicated by curve B of FIG. 3.

* * * * *